(12) United States Patent
Foster

(10) Patent No.: US 9,031,872 B1
(45) Date of Patent: May 12, 2015

(54) DIGITAL SIGN WITH INCORRECTLY STOCKED ITEM IDENTIFICATION

(71) Applicant: Target Brands, Inc., Minneapolis, MN (US)

(72) Inventor: Robert F. Foster, Ramsey, MN (US)

(73) Assignee: Target Brands, Inc., Minneapolis, MN (US)

(*) Notice: Subject to any disclaimer, the term of this patent is extended or adjusted under 35 U.S.C. 154(b) by 192 days.

(21) Appl. No.: 13/796,580

(22) Filed: Mar. 12, 2013

(51) Int. Cl.
  *G06Q 10/00* (2012.01)
  *G06Q 10/08* (2012.01)
  *G06F 3/147* (2006.01)

(52) U.S. Cl.
  CPC .............. *G06Q 10/087* (2013.01); *G06F 3/147* (2013.01)

(58) Field of Classification Search
  CPC ............................. G06Q 10/087; G06F 3/147
  USPC ................................ 705/20, 22, 28; 340/5.91
  See application file for complete search history.

(56) References Cited

U.S. PATENT DOCUMENTS

| | | | |
|---|---|---|---|
| 5,673,037 A | 9/1997 | Cesar et al. | |
| 5,828,318 A | 10/1998 | Cesar | |
| 5,942,987 A | 8/1999 | Heinrich et al. | |
| 5,963,134 A | 10/1999 | Bowers et al. | |
| 6,172,596 B1 | 1/2001 | Cesar et al. | |
| 6,195,006 B1 | 2/2001 | Bowers et al. | |
| 6,693,539 B2 | 2/2004 | Bowers et al. | |
| 6,812,852 B1 | 11/2004 | Cesar | |
| 6,919,793 B2 | 7/2005 | Heinrich et al. | |
| 7,084,769 B2 | 8/2006 | Bauer et al. | |
| 7,123,146 B1 | 10/2006 | Holzman | |
| 7,152,040 B1 | 12/2006 | Hawthorne et al. | |
| 7,158,046 B2 | 1/2007 | Cesar et al. | |
| 7,356,495 B2 | 4/2008 | Beigl et al. | |
| 7,616,094 B2 | 11/2009 | Heinrich et al. | |
| 2001/0000019 A1 | 3/2001 | Bowers et al. | |
| 2002/0118097 A1 | 8/2002 | Heinrich et al. | |
| 2003/0174099 A1 | 9/2003 | Bauer et al. | |
| 2003/0216969 A1 | 11/2003 | Bauer et al. | |
| 2003/0222762 A1 | 12/2003 | Beigl et al. | |
| 2005/0088286 A1 | 4/2005 | Heinrich et al. | |
| 2005/0168348 A1 | 8/2005 | Cesar et al. | |
| 2006/0232382 A1 | 10/2006 | Bauer et al. | |
| 2006/0238307 A1 | 10/2006 | Bauer et al. | |
| 2007/0159305 A1 | 7/2007 | Cesar et al. | |
| 2007/0176751 A1 | 8/2007 | Cesar et al. | |
| 2011/0102155 A1* | 5/2011 | Choi et al. | 340/10.6 |
| 2011/0199211 A1 | 8/2011 | Campero et al. | |
| 2011/0199290 A1* | 8/2011 | Vendrow | 345/156 |
| 2014/0139548 A1* | 5/2014 | Byers | 345/619 |
| 2014/0172650 A1* | 6/2014 | Cancro et al. | 705/28 |
| 2014/0258165 A1* | 9/2014 | Heil | 705/333 |

OTHER PUBLICATIONS

Barcoding Incorporated, Active Shelf System, RFID Tracking of Retail Inventories, http://www.barcoding.com/rfid/active-shelf.shtml, 2 pages, Nov. 2, 2012.

Koh et al., White Paper-Prediction, Detection, and Proof: An Integrated Auto-ID Solution to Retail Theft, Auto-ID Center, Massachusetts Institute of Technology, 19 pages, Jun. 1, 2003.

* cited by examiner

*Primary Examiner* — Hunter Wilder
(74) *Attorney, Agent, or Firm* — Nixon & Vanderhye P.C.

(57) ABSTRACT

A merchandising unit has a merchandise support unit supporting items for sale and an electronic sign. The electronic sign displays a price for correctly stocked items on the merchandise support unit, detects incorrectly stocked items on the merchandise support unit, retrieves a price for the incorrectly stocked items, and alters display information so that the price for the correctly stocked items and the price for the incorrectly stocked items are displayed.

14 Claims, 15 Drawing Sheets

DIGITAL SIGN WITH INCORRECTLY STOCKED ITEM IDENTIFICATION

BACKGROUND

Radio frequency identification (RFID) allows tags on merchandise to provide identifying information to an RFID sensor. In this way, the RFID sensor can detect and identify merchandise that is within its sensing area. Digital display signs are electronic displays that can change the information they provide based on changes in the merchandise placed on a shelving unit associated with the display.

The discussion above is merely provided for general background information and is not intended to be used as an aid in determining the scope of the claimed subject matter. The claimed subject matter is not limited to implementations that solve any or all disadvantages noted in the background.

SUMMARY

An electronic sign includes a sensor, a processor and a display. The sensor senses merchandise near the electronic sign and provides at least one merchandise identifier. The processor executes instructions that cause the processor to perform steps including determining that more than a threshold quantity of one type of merchandise near the electronic sign is misshelved based on the at least one merchandise identifier and altering display information to include a price for the one type of misshelved merchandise. The display then displays the altered display information.

A merchandising unit has a merchandise support unit supporting items for sale and an electronic sign. The electronic sign displays a price for correctly stocked items on the merchandise support unit, detects incorrectly stocked items on the merchandise support unit, retrieves a price for the incorrectly stocked items, and alters display information so that the price for the correctly stocked items and the price for the incorrectly stocked items are displayed.

A request for an identification of incorrectly stocked items is transmitted from a handheld device to a digital sign, where the digital sign is positioned on a merchandise support unit and displays information about items on the merchandise support unit. An identifier of at least one incorrectly stocked item is received at the handheld device from the digital sign, the at least one incorrectly stocked item comprising at least one item that has been stocked on the merchandise support unit but is not assigned to the merchandise support unit and that has been detected by a sensor in the digital sign. A description of at least one incorrectly stocked item is displayed on the handheld device based on the received identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A digital sign uses an RFID sensor to detect the identity of merchandise placed on a merchandise support unit associated with the sign. Examples of merchandise support units include shelves, gondolas, carousels, peg boards, and the like, found in retail stores. The digital sign compares the merchandise on the merchandise support unit to expected merchandise that has been assigned to the merchandise support unit. If more than a threshold number of incorrectly stocked items are present on the merchandise support unit, the digital sign displays a stocking alert such as a color code to indicate to store employees that some items on the merchandise support unit need to be moved. If the quantity of one type of incorrectly stocked items exceeds a second threshold, the digital sign automatically alters itself to provide a split screen display in which one portion of the display provides information about items originally assigned to the merchandise support unit and another portion of the display provides information about the incorrectly stocked items. Thus, the digital sign adapts to the incorrectly stocked items and provides sales information about the incorrectly stocked items in order to improve sales but only if the number of incorrectly stocked items exceeds a threshold that warrants the change to the digital sign.

In further embodiments, a handheld device may interrogate a digital or electronic sign positioned on a merchandising unit to request an identification of incorrectly stocked items on the merchandising unit. The digital sign, which displays information about items on the merchandising unit, returns identifiers for incorrectly stocked items to the handheld device. The display on the handheld device then displays a description of at least one incorrectly stocked item.

Figure 1:
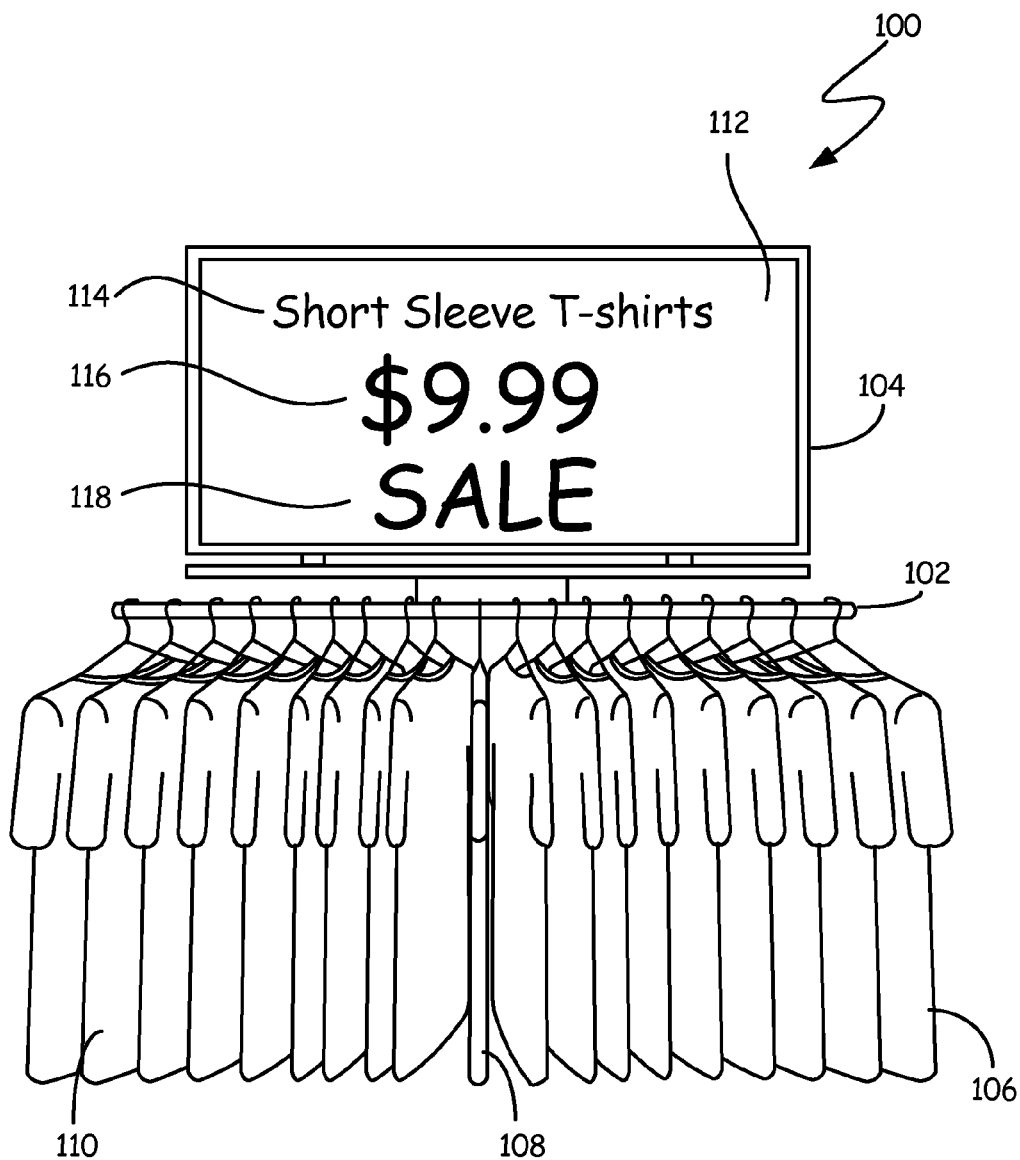
FIG. 1 is an example of a shelving unit with a digital display sign.

FIG. 1 provides an example of a merchandising unit 100 having a merchandise support unit 102 and an electronic or digital sign 104. Merchandise support unit 102 supports a plurality of items or merchandise such as T-shirts 106, 108 and 110 and can take the form of shelves, a gondola, a peg board, or a carousel, for example. Electronic sign 104 is structurally supported by merchandise support unit 102, although in other embodiments, electronic sign 104 may be independently supported. Electronic sign 104 provides an electronic display 112 that can display various types of information. In accordance with one embodiment, electronic display 112 is a Liquid Crystal Display (LCD). However, other types of displays may be used.

In FIG. 1, electronic display 112 describes the merchandise on merchandise support unit 102 by providing the name 114, shown as "Short Sleeve T-shirts", the price 116, shown as "$9.99," and a sale identifier 118 indicating that the merchandise on merchandise support unit 102 is on sale.

Figure 2:
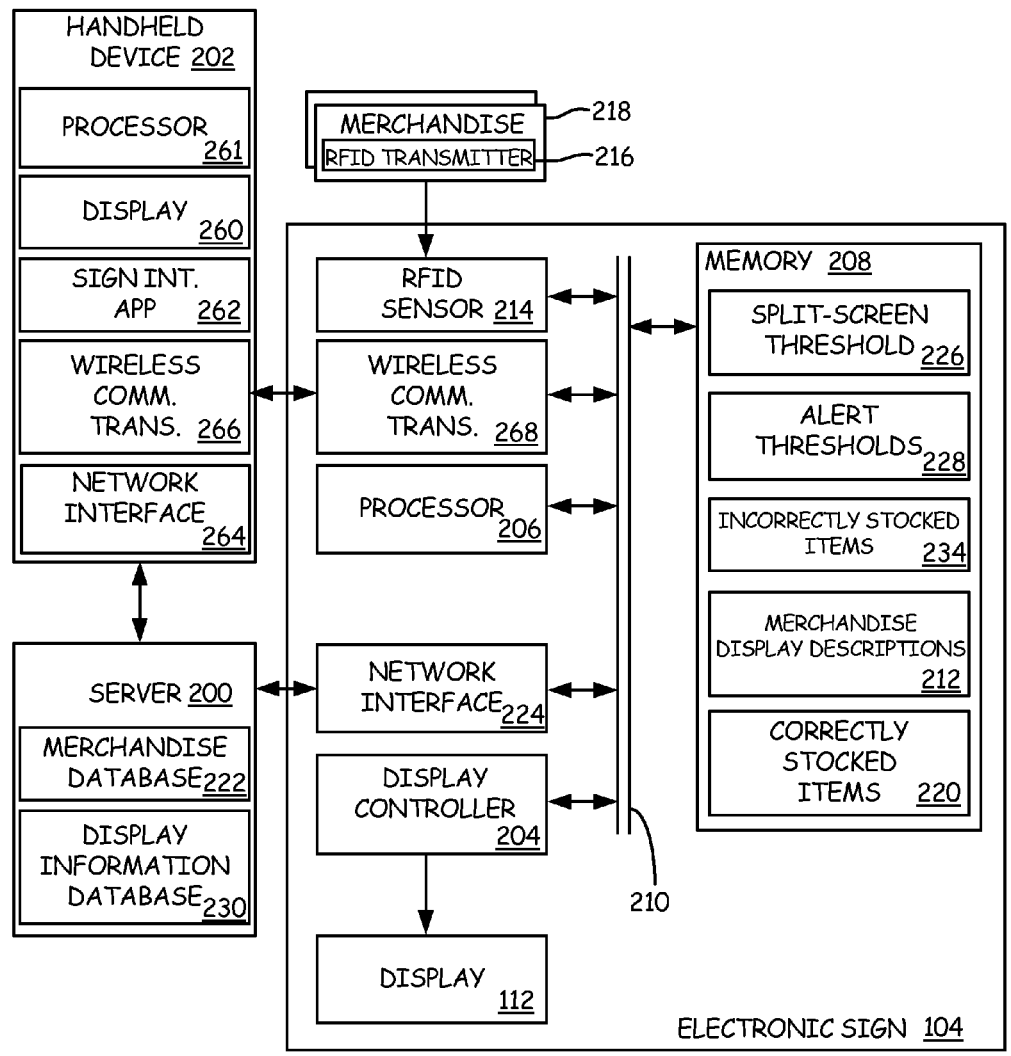
FIG. 2 is a block diagram of a digital sign system.

FIG. 2 provides a block diagram of an electronic or digital sign 104, a server 200 and a handheld device 202. As shown in FIG. 2, electronic sign 104 includes electronic display 112, display controller 204, processor 206, memory 208 and communication bus 210. Electronic sign 104 also includes an RFID sensor 214, which detects radio frequency signals produced by RFID transmitters 216 on merchandise 218. The radio frequency signals provided by RFID transmitters 216 include merchandise identifiers that identify merchandise 218. Such RFID transmitters 216 may be provided within tags connected to the merchandise or within containers holding the merchandise, for example. RFID sensor 214 converts each RFID signal into a merchandise identifier that is provided to processor 206 along communication bus 210. Although Radio Frequency Identification is described herein, other communication standards may be used in which a transmitter on a piece of merchandise emits a signal that is sensed by a sensor within electronic sign 104 to identify the piece of merchandise.

Figure 3:
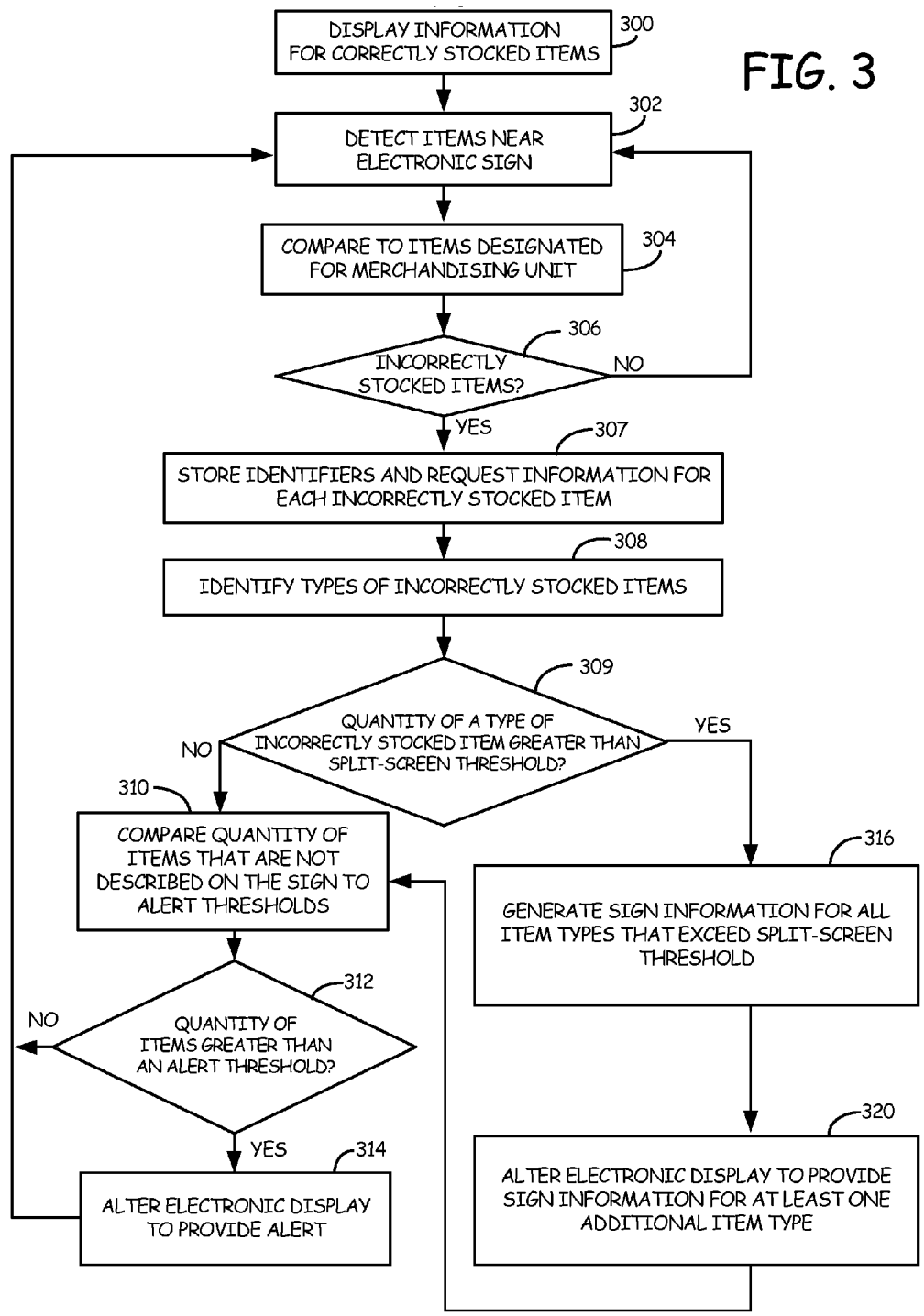
FIG. 3 is a flow diagram of a method of altering a digital sign using RFID.

FIG. 3 provides a flow diagram of a method implemented by electronic sign 104 to provide merchandise information on electronic display 112. In step 300, electronic sign 104 displays information for correctly stocked items on electronic display 112. To do this, processor 206 first determines what items have been designated for the merchandise support unit associated with electronic sign 104 by retrieving identifiers for correctly stocked items 220 stored in memory 208. In accordance with one embodiment, the identifiers for correctly stocked items 220 are initially provided to electronic sign 104 by server 200 through a network interface 224, such as a wired Local Area Network (LAN) interface or a wireless interface. In accordance with one embodiment, the identifiers for correctly stocked items 220 are taken from a merchandise database 222, which designates a merchandise support unit for each piece of merchandise in a store. In accordance with some embodiments, the identifiers for correctly stocked items are pushed from server 200 to electronic sign 104. In other embodiments, electronic sign 104 periodically requests the identifiers for correctly stocked items. In accordance with one embodiment, server 200 communicates with a plurality of electronic signs and is able to store identifiers for correctly stocked items in each of the plurality of electronic signs.

Based on the identifiers for correctly stocked items 220, processor 206 accesses merchandise display descriptions 212 in memory 208 to retrieve information about the correctly stocked items. This information can include a description of the correctly stocked items, the price of the items and an indication of whether the items are on sale. In further embodiments, the displayed description may include style(s) of the items, size(s) of the items and/or color(s) of the items. Processor 206 provides the retrieved merchandise display descriptions to display controller 204 through communication bus 210. Display controller 204 then sends display signals to electronic display 112 to show the merchandise display description.

At step 302, electronic sign 104 detects merchandise near the electronic sign such as merchandise on the merchandise support unit 102. To detect merchandise 218 near the electronic sign, electronic sign 104 uses RFID sensor 214 to sense the RFID signals produced by RFID transmitters 216 on the merchandise 218. In accordance with one embodiment, merchandise is considered to be near electronic sign 104 if RFID sensor 214 can detect the RFID signals produced by the transmitters on the merchandise. In other embodiments, the magnitude of the RFID signal detected by RFID sensor 214 must exceed a set threshold in order for the merchandise to be considered to be near electronic sign 104.

At step 304, processor 206 compares the merchandise identifiers provided by RFID sensor 214 to identifiers for correctly stocked items 220. Processor 206 then determines if there are any incorrectly stocked items on the merchandise support unit associated with electronic sign 104 at step 306. An incorrectly stocked item, also referred to as a misshelved item, is an item that is on the merchandise support unit but has not been assigned to the merchandise support unit and thus is not listed in correctly stocked items 220 for the merchandising unit. Items can be incorrectly stocked when an employee places the item in an incorrect location or when a customer moves an item from one merchandise support unit to another. If there are no incorrectly stocked items at step 306, the process returns to step 302 where electronic sign 104 once again detects items near electronic sign 104. In other embodiments, processor 206 forwards the detected merchandise identifiers to server 200, which then performs steps 304 and 306 to determine if there are any incorrectly stocked items near electronic sign 104.

If there is an incorrectly stocked item at step 306, processor 206 stores the identifiers for the incorrectly stocked items and requests display information for the incorrectly stocked items at step 307. In particular, the merchandise identifiers from RFID sensor 214 for the incorrectly stocked items are stored in incorrectly stocked items 234 of memory 208. In accordance with one embodiment, processor 206 requests display information for the incorrectly stocked items from server 200 through network interface 224. Server 200 accesses a display information database 230 to acquire the display information for the incorrectly stocked items and returns the information through network interface 224 to processor 206. The information obtained by processor 206 from server 200 can include attributes of the items such as the name, size, price, color, brand and style and whether the incorrectly stocked merchandise is on sale.

At step 308, processor 206 groups the incorrectly stocked items into one or more item types based on the information obtained for the incorrectly stocked items. This grouping can be done on the basis of one or more of the attributes of the incorrectly stocked items, such as the names, sizes, colors, styles or brands of the incorrectly stocked items.

At step 309, processor 206 determines if the quantity of a type of incorrectly stocked item is greater than a split-screen threshold 226 stored in memory 208. Split-screen threshold 226 represents the quantity of a type of item that must be present on a merchandise support unit to trigger a change in the electronic display to show information about that type of incorrectly stocked item. If the quantity of at least one type of incorrectly stocked item is not greater than split-screen threshold 226 at step 309, the quantity of merchandise items that are not described on display 112 is compared to a set of alert thresholds 228 at step 310. A merchandise item is considered to not be described on display 112 if display 112 does not provide any information about the merchandise item.

Alert thresholds 228 are a collection of thresholds for quantities of incorrectly stocked items that will cause various alerts to be displayed on electronic display 112. In accordance with one embodiment, alert thresholds 228 consist of three thresholds: a low alert threshold, a middle alert threshold, and a high alert threshold. If the quantity of incorrectly stocked items is greater than at least one of the alert thresholds at step 312, the electronic display 112 is altered at step 314 to provide a visual alert that incorrectly stocked items are present on the merchandise support unit. In accordance with an embodiment where there are three separate thresholds, there are three different visual alerts that can be displayed.

Figure 4:
FIG. 4 is an example of a digital sign showing a first stocking alert.

FIG. 4 provides an example of electronic display 112 altered to provide an alert 400 in response to an incorrectly stocked item 402 being present on merchandise support unit 102. As shown in FIG. 4, incorrectly stocked item 402 is a collared shirt which has been misshelved on short sleeve T-shirt merchandise support unit 102. In accordance with some embodiments, alert 400 is a colored alert where the color of the alert indicates how many incorrectly stocked items are on the merchandise support unit. In accordance with one particular embodiment, alert 400 is yellow indicating that the lowest threshold has been exceeded but the middle threshold has not been exceeded.

Figure 5:
FIG. 5 is an example of a digital sign showing a second stocking alert.

FIG. 5 provides an example of a second alert 500 displayed on electronic display 112 that is colored a second color, such as orange, to indicate that the number of incorrectly stocked items exceeds a second or middle threshold but not a third or high threshold. For example, in FIG. 5, four collared shirts 402, 501, 502, and 504 have been incorrectly stocked on merchandise support unit 102.

Figure 6:
FIG. 6 is an example of a digital sign showing a third stocking alert.

FIG. 6 provides an example of a third alert 600 on display 112 that is colored a third color, such as red, to indicate that the quantity of incorrectly stocked items exceeds a third or high threshold. In particular, in FIG. 6, collared shirts 402, 501, 502, and 504 have been incorrectly stocked on merchandise support unit 102 as well as long sleeve shirts 601, 602 and 604.

Thus, as shown in FIGS. 4, 5 and 6, by using different alert colors, electronic display 112 is able to indicate different degrees of misshelving on merchandise support unit 102 and thereby allow employees to prioritize which merchandise support units to reorganize first.

If the quantity of at least one type of incorrectly stocked item is greater than split-screen threshold 226 in step 309, the process continues at step 316 where processor 206 generates sign information for all item types that exceed the split-screen threshold. In accordance with one embodiment, generating sign information for an item type comprises selecting information from the information obtained at step 307. In accordance with one embodiment, the information that is selected is information that is common to the merchandise items assigned to the item type. For example, the name, color, style, price and whether the item is on sale.

The generated sign information is then used to alter the merchandise display description 212 at step 320 so that the altered merchandise display description 212 provides a split screen with a portion of the split screen showing information about the correctly stocked items and a portion of the split screen showing information for each item type that exceeds the split-screen threshold. For example, the merchandise display description 212 can be altered to include a price for an incorrectly stocked item type that exceeds the split-screen threshold. In accordance with one embodiment, the altered merchandise display description 212 does not provide information about all incorrectly stocked items on the merchandise support unit. If processor 206 determines that the quantity of an incorrectly stocked item type does not exceed the split-screen threshold, merchandise display description 212 is not altered to include information about those incorrectly stocked items. Thus, the split-screen display may show information for some incorrectly stocked items on the merchandise support unit while not showing information for other incorrectly stocked items.

Processor 206 then provides the altered merchandise display description 212 to display controller 204, which alters electronic display 112 to display the altered merchandise display description 212 such that sign information is displayed for both the correctly stocked items and the incorrectly stocked item types that exceeded the split-screen threshold.

Figure 7:
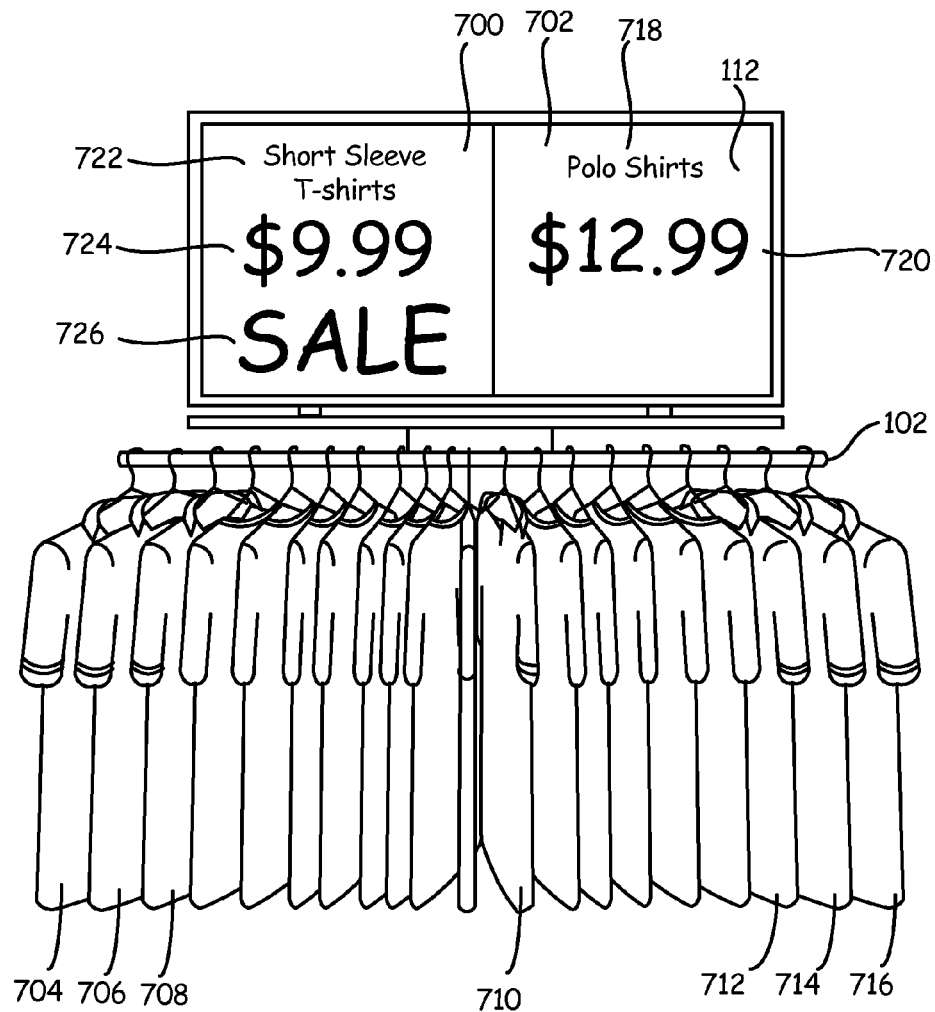
FIG. 7 is an example of a digital sign showing split signage based on detected merchandise.

FIG. 7 provides an example of a split screen shown on electronic display 112. On electronic display 112, the correctly stocked items are shown in a correctly stocked display area 700 and the incorrectly stocked item types that exceed the split-screen threshold are shown in an incorrectly stocked display area 702. In FIG. 7, collared shirts 704, 706, 708, 710, 712, 714 and 716 are all the same type and this quantity of collared shirts exceeds the split-screen threshold.

As shown in FIG. 7, incorrectly stocked display area 702 displays information such as the name 718 of the incorrectly stocked items and the price 720 of the incorrectly stocked items. In additional embodiments, an indication of whether the incorrectly stocked items are for sale as well as sizes, colors and styles of the incorrectly stocked items may be provided in incorrectly stocked display area 702. Correctly stocked display area 700 also includes a name 722 for the correctly stocked items, a price 724 for the correctly stocked items and a sale identifier 726 for the correctly stocked items. In further embodiments, correctly stocked display area 700 may also include descriptions of the sizes, colors and styles of the correctly stocked items.

Although the split screen of electronic display 112 is shown as being vertically divided into two halves, in other embodiments, the split screen may be horizontally divided or may be diagonally divided. Further, although only two areas are shown in the split-screen format, if more than one type of incorrectly stocked item exceeds the split-screen threshold, electronic display 112 may be divided into more than two areas with a separate area for each type of merchandise that exceeds the split-screen threshold.

After step 320, the process continues at step 310 where the quantity of items that are not described on display 112 is compared to the alert thresholds. If the quantity of items that are not described on display 112 is greater than an alert threshold at step 312, electronic display 112 is altered to provide an alert at step 314.

Figure 8:
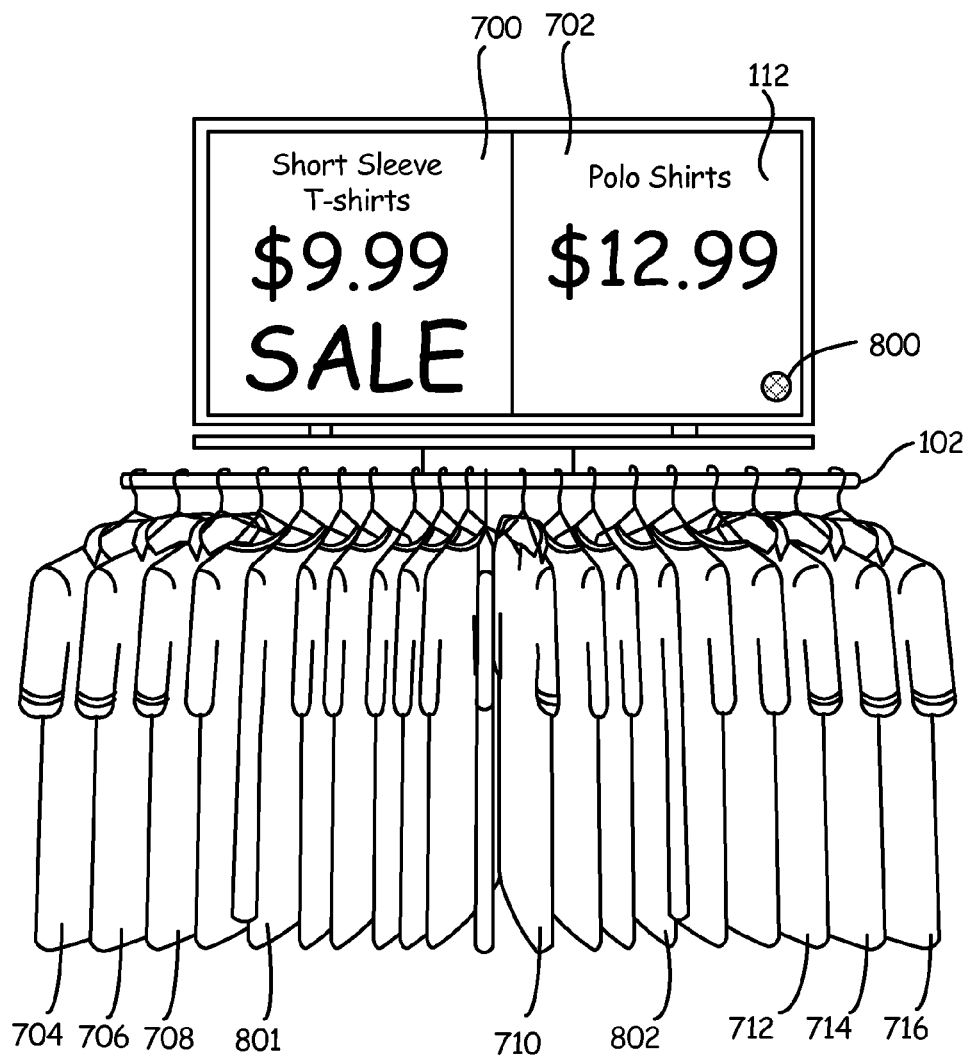
FIG. 8 is an example of a digital sign showing split signage with a first type of stocking alert.
Figure 9:
FIG. 9 is an example of a digital sign showing split signage with a second type of stocking alert.
Figure 10:
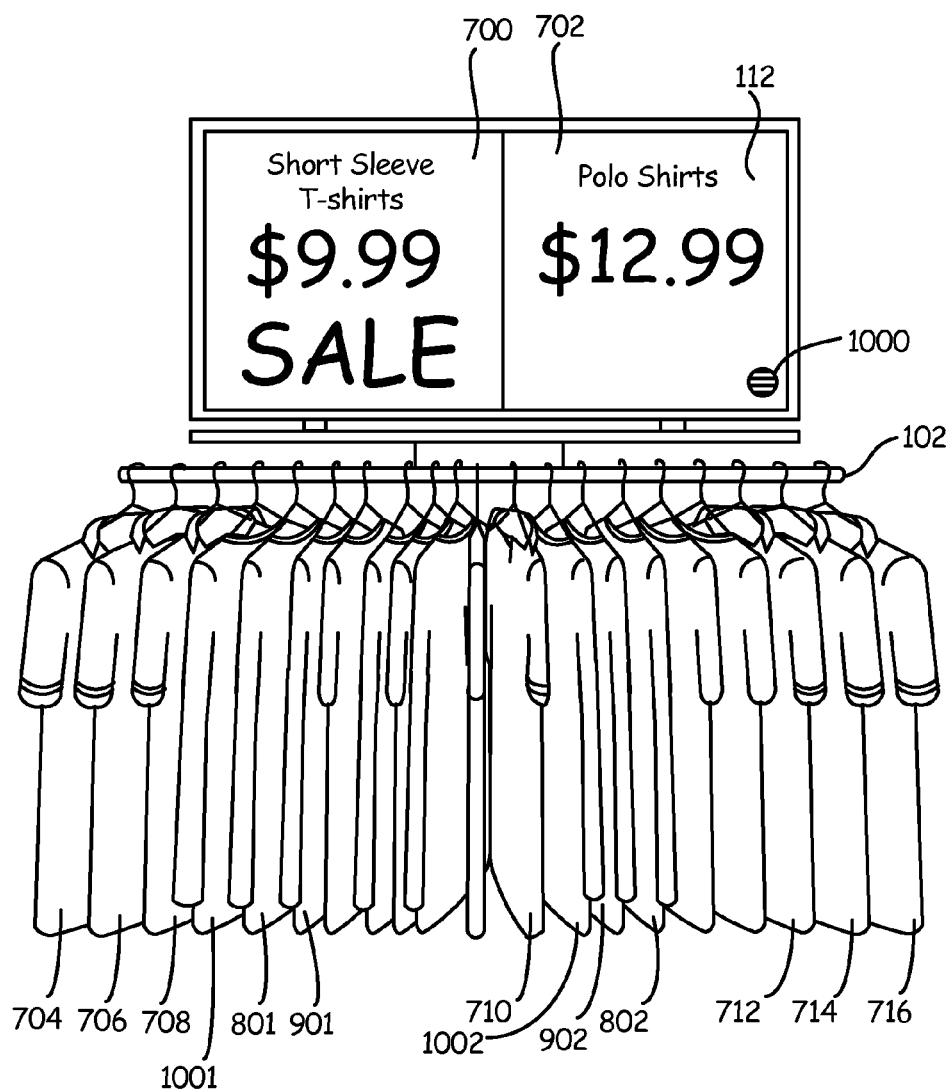
FIG. 10 is an example of a digital sign showing split signage with a third type of stocking alert.

FIGS. 8, 9 and 10 provide examples of modified split-screen displays showing incorrectly stocked item alerts. In particular, the incorrectly stocked item alerts of FIGS. 8, 9 and 10 are colored alerts wherein the color of the alert indicates a quantity of incorrectly stocked merchandise that is not described in the altered display information.

In FIG. 8, electronic display 112 is shown as having correctly stocked display area 700, incorrectly stocked items display area 702 and incorrectly stocked items alert 800. In accordance with one embodiment, alert 800 is colored a first color, such as yellow, to indicate that more than a lowest alert threshold of incorrectly stocked items is present on merchandise support unit 102. Note that in FIG. 8, collared shirts 704, 706, 708, 710, 712, 714 and 716 are present and incorrectly stocked but only long sleeve shirts 801 and 802 cause alert 800 to be displayed on electronic display 112. Collared shirts 704, 706, 708, 710, 712, 714 and 716 cause incorrectly stocked area 702 to be displayed on electronic display 112 so that a description of the collared shirts and the price of the collared shirts can be presented to the consumer. Collared shirts 704, 706, 708, 710, 712, 714 and 716 do not affect the type of alert 800 provided in electronic display 112.

In FIG. 9, a second alert 900 is provided indicating that the quantity of incorrectly stocked items exceeds a second larger threshold. In accordance with one embodiment, second alert 900 is colored a second color, such as orange. As shown in FIG. 9, collared shirts 704, 706, 708, 710, 712, 714 and 716 are present on merchandise support unit 102 but do not contribute to the selection of alert 900. Instead, the collared shirts cause electronic display 112 to be split into incorrectly stocked items display area 702 and correctly stocked items display area 700. In FIG. 9, long sleeve shirts 801 and 802 have been joined by long sleeve shirts 901 and 902, causing the change in the stocking alerts on electronic display 112.

FIG. 10 provides an example of a third alert 1000, which in accordance with one embodiment is colored a third color, such as red, to indicate that the quantity of incorrectly stocked items exceeds a highest alert threshold. In FIG. 10, collared shirts 704, 706, 708, 710, 712, 714 and 716 are present but do not affect the selection of alert 1000. Instead, the collared shirts cause electronic display 112 to be split into an incorrectly stocked items area 702 and a correctly stocked items display area 700. In FIG. 10, incorrectly stocked items 801, 802, 901 and 902 have been joined by incorrectly stocked items 1001 and 1002. These additional incorrectly stocked items cause alert 1000 to be displayed instead of alert 900 of FIG. 9, thereby indicating that more incorrectly stocked items are present on merchandise support unit 102 in FIG. 10 than in FIG. 9.

In the discussion above, processor 206 is shown to have performed the steps of FIG. 3. In other embodiments, server 200 stores split-screen thresholds 226, alert thresholds 228, correctly stocked items 220, incorrectly stocked items 234 and merchandise display descriptions 212 and server 200 performs steps 304, 306, 307, 308, 309, 310, 312 and 316. Further, server 200 provides instructions to processor 206 to perform steps 300, 314 and 320 to alter the electronic display.

In accordance with further embodiments, electronic sign 104 is capable of being interrogated by a handheld device 202 so that electronic sign 104 will provide merchandise identifiers for incorrectly stocked items that processor 206 has identified. Handheld device 202 may be any mobile device such as a mobile phone, a personal digital assistant, a tablet computer or a dedicated handheld device produced specifically for retail applications, for example.

Figure 11:
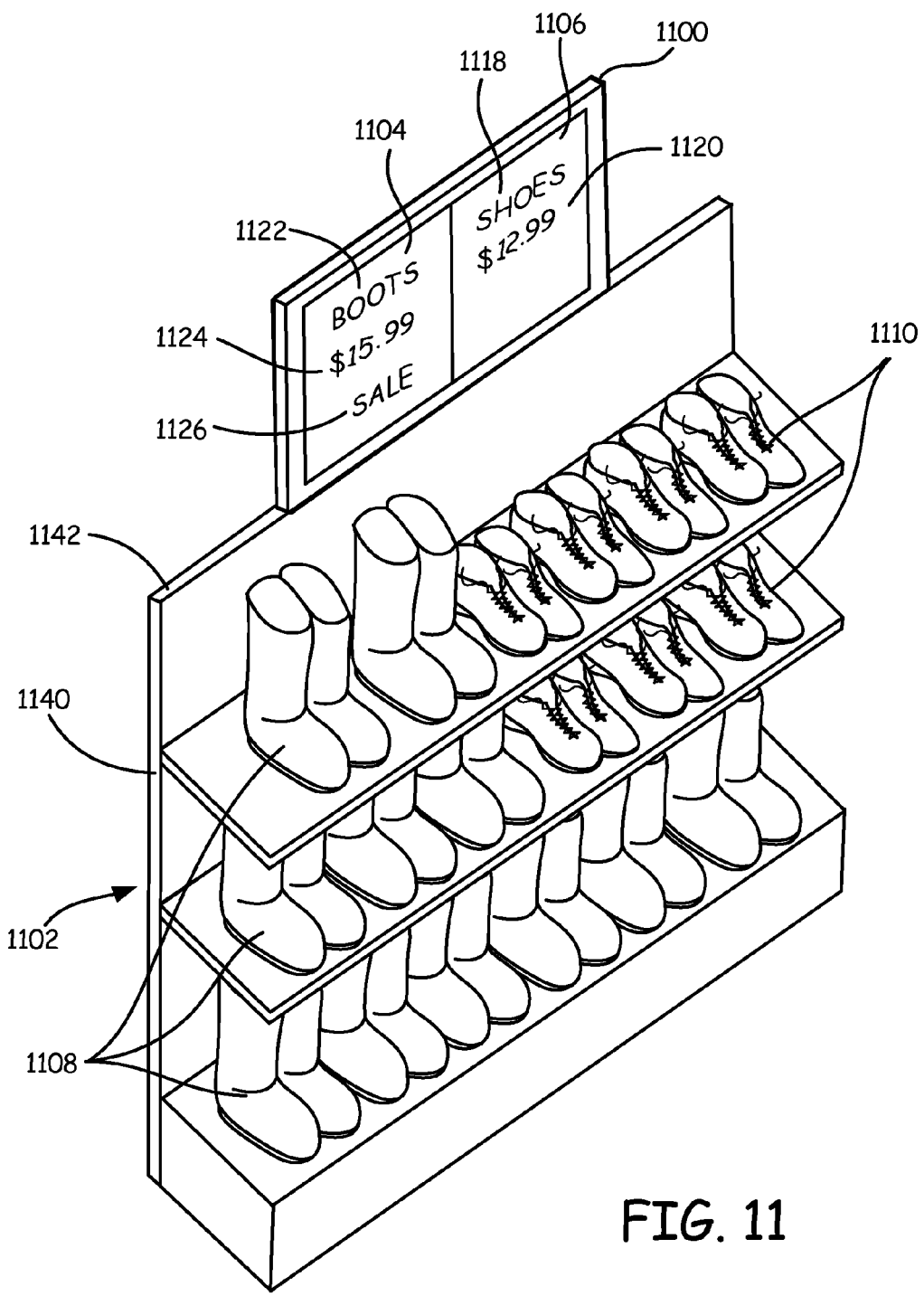
FIG. 11 is an example of a digital sign showing split signage based on detected merchandise on a shelving unit.

FIG. 11 provides an example of a split screen shown on an electronic display 1100 attached to a shelving unit 1102. On electronic display 1100, the correctly stocked items are shown in a correctly stocked display area 1104 and the incorrectly stocked item types that exceed the split-screen threshold are shown in an incorrectly stocked display area 1106. In FIG. 11, boots, such as boots 1108, are the correctly stocked items and shoes, such as shoes 1110, are incorrectly stocked items that exceed the split-screen threshold.

As shown in FIG. 11, incorrectly stocked display area 1106 displays information such as the name 1118 of the incorrectly stocked items and the price 1120 of the incorrectly stocked items. In additional embodiments, an indication of whether the incorrectly stocked items are for sale as well as sizes, colors and styles of the incorrectly stocked items may be provided in incorrectly stocked display area 1106. Correctly stocked display area 1104 also includes a name 1122 for the correctly stocked items, a price 1124 for the correctly stocked items and a sale identifier 1126 for the correctly stocked items. In further embodiments, correctly stocked display area 1104 may also include descriptions of the sizes, colors and styles of the correctly stocked items. In accordance with further embodiments, display 1100 may also include visual alerts that additional items other than shoes 1110 are incorrectly stocked on display unit 1102. These alerts may be similar to the alerts shown in FIGS. 8-10 described above.

Although the split screen of electronic display 1100 is shown as being vertically divided into two halves, in other embodiments, the split screen may be horizontally divided or may be diagonally divided. Further, although only two areas are shown in the split-screen format, if more than one type of incorrectly stocked item exceeds the split-screen threshold, electronic display 1100 may be divided into more than two areas with a separate area for each type of merchandise that exceeds the split-screen threshold.

In FIG. 11, display 1100 is attached to a back panel 1140 of shelving unit 1102 and extends across a top surface 1142 of back panel 1140.

Figure 12:
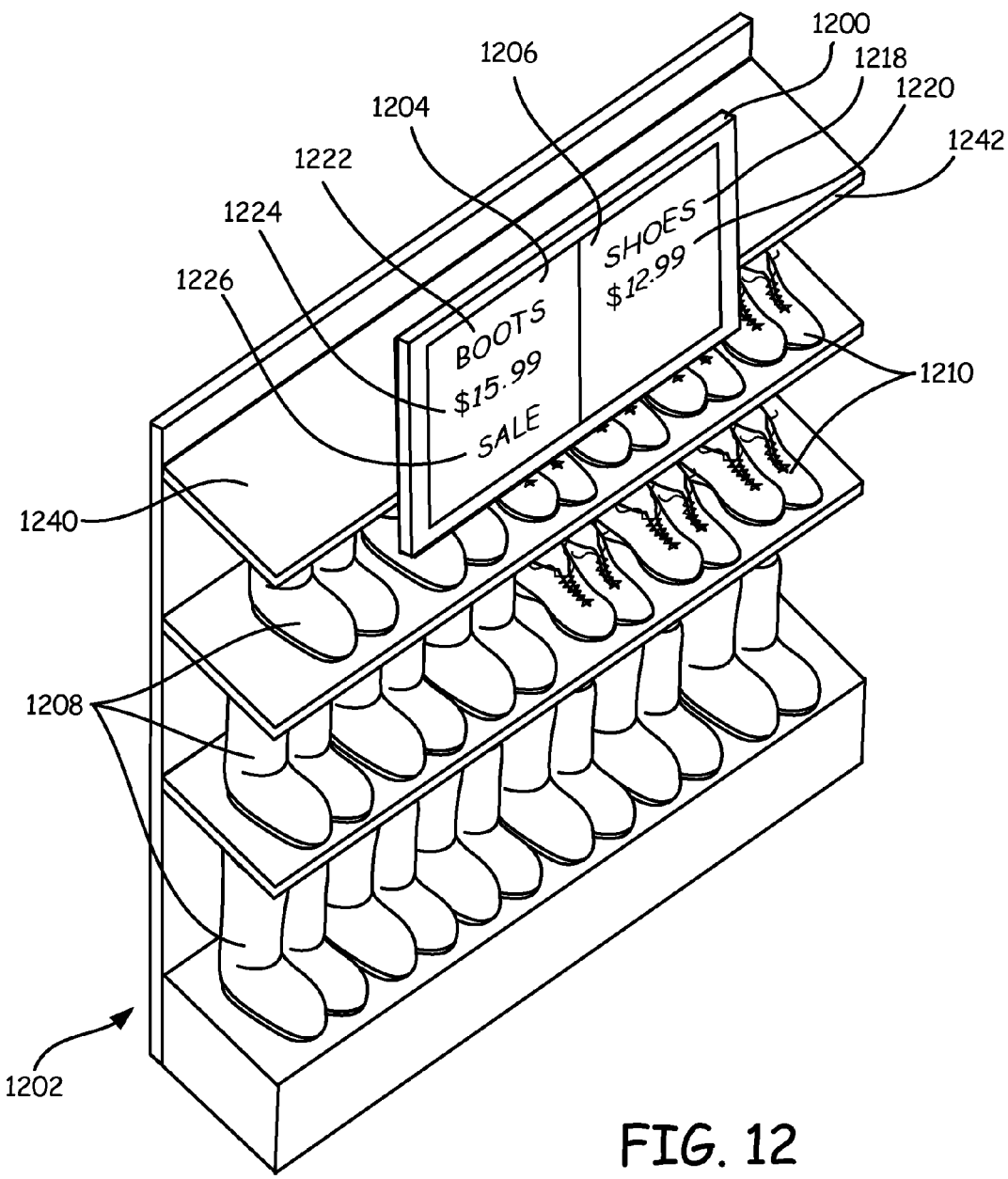
FIG. 12 is a further example of a digital sign showing split signage based on detected merchandise on a shelving unit.

FIG. 12 provides an example of a split screen shown on an electronic display 1200 attached to a shelving unit 1202. On electronic display 1200, the correctly stocked items are shown in a correctly stocked display area 1204 and the incorrectly stocked item types that exceed the split-screen threshold are shown in an incorrectly stocked display area 1206. In FIG. 12, boots, such as boots 1208, are the correctly stocked items and shoes, such as shoes 1210, are incorrectly stocked items that exceed the split-screen threshold.

As shown in FIG. 12, incorrectly stocked display area 1206 displays information such as the name 1218 of the incorrectly stocked items and the price 1220 of the incorrectly stocked items. In additional embodiments, an indication of whether the incorrectly stocked items are for sale as well as sizes, colors and styles of the incorrectly stocked items may be provided in incorrectly stocked display area 1206. Correctly stocked display area 1204 also includes a name 1222 for the correctly stocked items, a price 1224 for the correctly stocked items and a sale identifier 1226 for the correctly stocked items. In further embodiments, correctly stocked display area 1204 may also include descriptions of the sizes, colors and styles of the correctly stocked items. In accordance with further embodiments, display 1200 may also include visual alerts that additional items are incorrectly stocked on display unit 1202. These alerts may be similar to the alerts shown in FIGS. 8-10 described above.

Although the split screen of electronic display 1200 is shown as being vertically divided into two halves, in other embodiments, the split screen may be horizontally divided or may be diagonally divided. Further, although only two areas are shown in the split-screen format, if more than one type of incorrectly stocked item exceeds the split-screen threshold, electronic display 1200 may be divided into more than two areas with a separate area for each type of merchandise that exceeds the split-screen threshold.

In FIG. 12, display 1200 is attached to a shelf 1240 of shelving unit 1202 and is positioned in front of a front surface 1242 of shelf 1240. Display 1200 extends both above and below shelf 1240. In other embodiments, display 1200 may be positioned entirely above shelf 1240 or entirely below shelf 1240.

Figure 13:
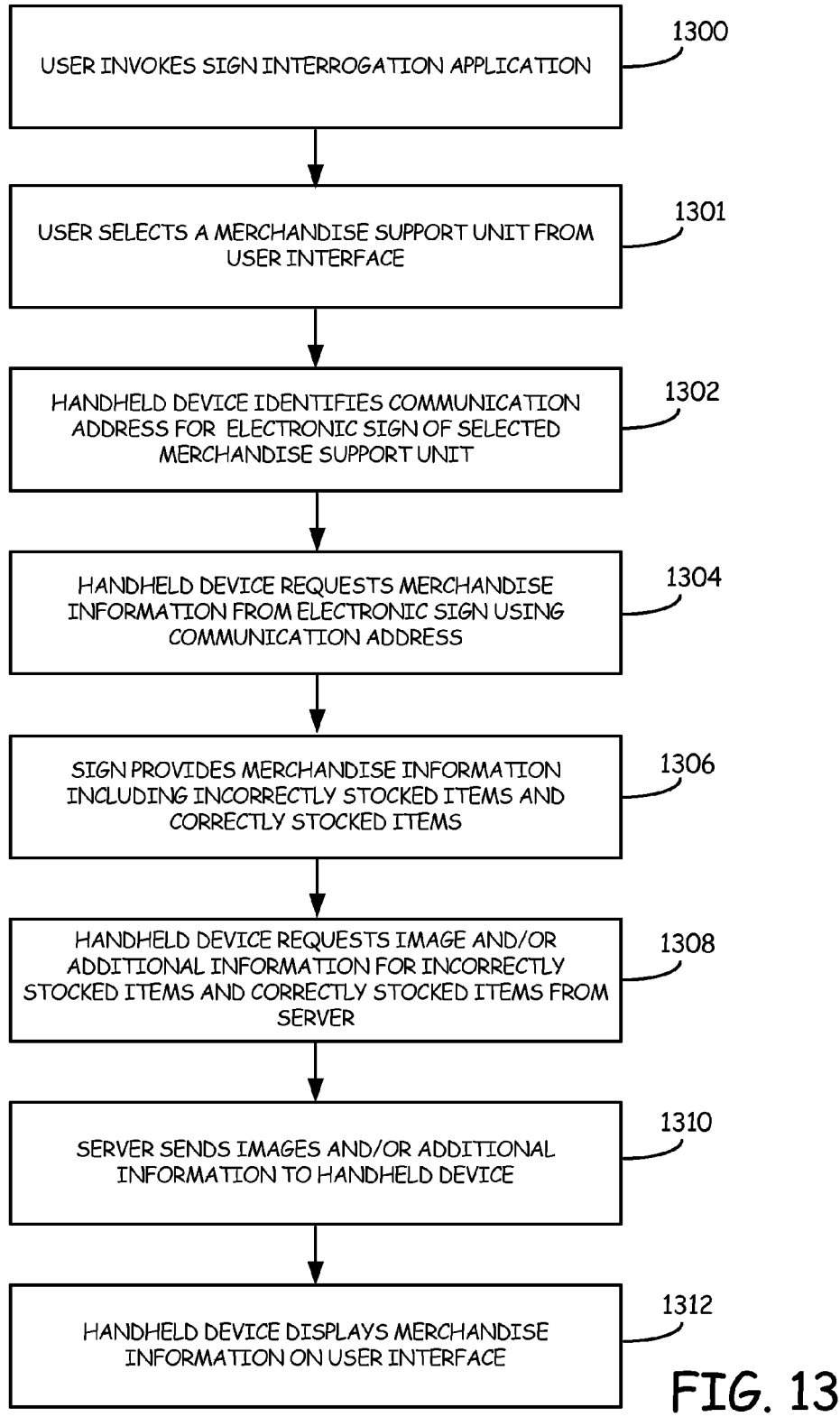
FIG. 13 is a flow diagram of a method of interrogating a digital sign using a handheld device.
Figure 14:
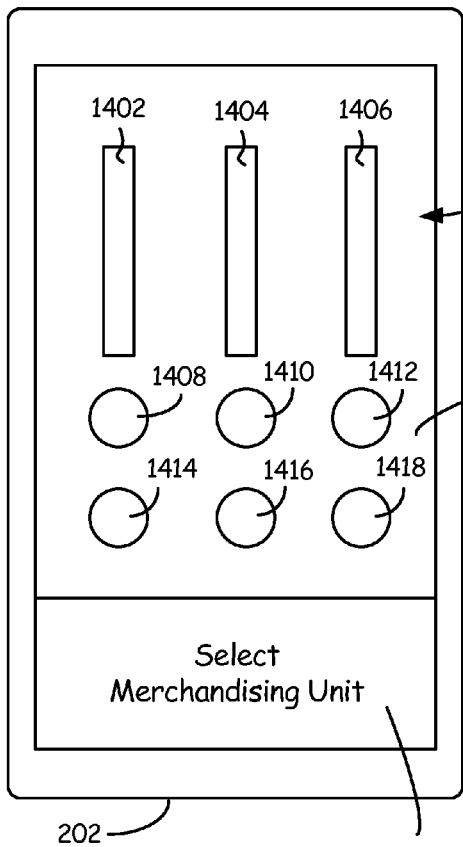
FIG. 14 is an example of a user interface on a handheld device used to select a display unit.

FIG. 13 provides a flow diagram for using a handheld device to interrogate an electronic sign such as electronic sign 104. In step 1300, a user invokes a sign interrogation application 262, which when executed by processor 261 generates a user interface on electronic display 260 of handheld device 202 for selecting a merchandise support unit. FIG. 14 provides an example of such a user interface 1400 on electronic display 260. User interface 1400 includes a schematic view of a layout of merchandise support units in a retail environment including shelving units 1402, 1404 and 1406 and carousels

1408, 1410, 1412, 1414, 1416 and 1418. Each merchandise support unit displayed in user interface 1400 is a selectable icon that can be selected by tapping on the icon. For example, carousel 1408 is shown as a circular icon that can be selected by tapping on the icon. User interface 1400 also includes an instruction 1420 instructing the user on how to interact with the user interface. Although user interface 1400 includes only icons, in other embodiments, textual descriptions of each of the merchandising units may be provided in user interface 1400 or may be brought up in a pop-up window by selecting one of the displayed icons.

At step 1301, the user selects one of the merchandise support units in user interface 1400. At step 1302, sign interrogation application 262 receives the selection of the merchandise support unit and determines a communication address for an electronic sign associated with the selected merchandise support unit. In some embodiments, the communication address is stored within the handheld device. In other embodiments, processor 261 makes a request through network interface 264 to server 200 for the communication address of the electronic sign. In accordance with one embodiment, the communication address is stored in display information database 230 and is retrieved by server 200 by applying an identifier for the merchandise support unit to display information database 230. Server 200 returns the identified communication address through network interface 264 to processor 261.

For Bluetooth® communications, the communication address can take the form of a name for the electronic sign 104 that has previously been stored in handheld device 202 during a paring process between handheld device 202 and electronic sign 104. For Wi-Fi communications, the communication address can take the form of a network address for electronic sign 104.

At step 1304, sign interrogation application 262 of handheld device 202 uses wireless communication transceiver 266 to transmit a request for an identification of incorrectly stocked items and correctly stocked items to electronic sign 104. Wireless communication transceiver 266 can take the form of a Bluetooth® radio transceiver or a Wi-Fi transceiver. The request is sent using the communication address identified in step 1302. In electronic sign 104, the request is received by a wireless communication transceiver 268 that can be either a Bluetooth® radio transceiver, a Wi-Fi transceiver, or some other communication circuit. In response to the request, processor 206 accesses memory 208 to retrieve a merchandise identifier for at least one incorrectly stocked item and, optionally, one or more merchandise identifiers for correctly stocked items. The merchandise identifier for the at least one incorrectly stocked item is retrieved from incorrectly stocked items 234 in memory 208. As discussed above, incorrectly stocked items 234 contain merchandise identifiers for items that have been stocked on the merchandise support unit but that are not assigned to the merchandise support unit. The merchandise identifiers for the correctly stocked items are taken from correctly stocked items 220. Processor 206 then returns the merchandise identifiers for the incorrectly stocked items and the merchandise identifiers for the correctly stocked items to handheld device 202 through wireless communication transceiver 268 and wireless communication transceiver 266 at step 1306. Thus, at step 1306, handheld device 202 receives an identifier of at least one incorrectly stocked item and an identifier for at least one correctly stocked item.

In accordance with one embodiment, the identifiers of the incorrectly stocked items received by handheld device 202 include identifiers for incorrectly stocked item types that are described on a split screen of electronic display 112 and identifiers for incorrectly stocked items that are not described on electronic display 112. In accordance with other embodiments, the identifiers of the incorrectly stocked items received by handheld device 202 only include identifiers for incorrectly stocked items that are not described on electronic display 112.

At step 1308, handheld device 202 uses the merchandise identifiers to request image and/or additional information for the incorrectly stocked items and the correctly stocked items from server 200. This request can be made through network interface 264 by passing the merchandise identifiers to server 200. In accordance with one embodiment, network interface 264 is a wireless network interface such as a Wi-Fi network interface. Server 200 then access merchandise database 222 to retrieve information and images for the incorrectly stocked items and the correctly stocked items.

At step 1310, server 200 sends the images and/or additional information to handheld device 202 through the network interface 264. At step 1312, sign interrogation application 262 on handheld device 202 generates a user interface on display 260 that displays merchandise information for the merchandise support unit corresponding to electronic sign 104. The merchandise information can include a description of each incorrectly stocked item such as the name of the item, the size of the item, the color of the item, the style of the item, the brand of the item, the correct merchandise support unit for the item and an image of the item, for example. The merchandise information can also include a description of each correctly stocked item such as the name of the item, the size of the item, the color of the item, the style of the item, the brand of the item, and an image of the item, for example.

In an alternative embodiment, handheld device 202 does not identify a communication address for the electronic sign at step 1302 but instead requests the merchandise information from server 200 instead of from electronic sign 104 at step 1304. This request includes an identifier for the merchandise support unit, which is used by server 200 to retrieve information about the items stocked on the merchandise support unit that has previously been sent to the server by electronic sign 104. In particular, server 200 accesses information about correctly stocked items and incorrectly stocked items on the merchandise support unit. Server 200 then forwards images and/or additional information for the correctly stocked items and the incorrectly stocked items to handheld device 202, which displays merchandise information on display 260. The merchandise information can include a description of each incorrectly stocked item such as the name of the item, the size of the item, the color of the item, the style of the item, the brand of the item, the correct merchandise support unit for the item and an image of the item, for example. The merchandise information can also include a description of each correctly stocked item such as the name of the item, the size of the item, the color of the item, the style of the item, the brand of the item, and an image of the item, for example.

Figure 15:
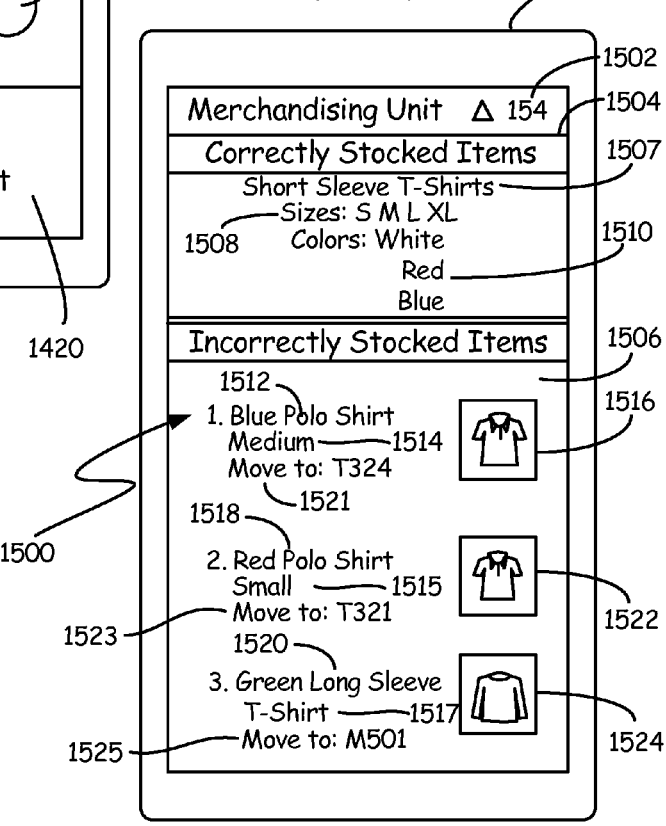
FIG. 15 is an example of a user interface showing the results of an interrogation by a handheld device of a digital sign.

FIG. 15 provides an example of a user interface 1500 displaying merchandise information on display 260 of handheld device 202. User interface 1500 includes a merchandising unit identification field 1502 that provides a merchandising unit identifier, a correctly stocked items field 1504 that lists identification information for correctly stocked items and an incorrectly stocked items field 1506 that lists items that have been incorrectly stocked.

Correctly stocked items field 1504 includes a description of correctly stocked items including a name 1507 of the correctly stocked items, sizes 1508 of the correctly stocked items and colors 1510 of the correctly stocked items. Other possible attributes that may be in the description for correctly stocked items include styles, cuts, and brands, for example. In accordance with one embodiment, only those attributes that are common to all of the correctly stocked items are displayed in correctly stocked items field 1504. In accordance with other embodiments, lists of all attributes of correctly stocked items are displayed in correctly stocked items field 1504. Although only a single named item is shown in FIG. 15, items with different names may be present in correctly stocked items 1504.

Incorrectly stocked items field 1506 includes descriptions of individual items that have been misshelved on the merchandising unit. For each item, the description can include a name of the item, such as names 1512, 1518 and 1520, an attribute of the item, such as attributes 1514, 1515 and 1517, a location where the item should be stocked, such as locations 1521, 1523, and 1525, and an image, such as images 1516, 1522 and 1524. The images of the incorrectly stocked items allow an employee to quickly identify which items need to be removed from the merchandise support unit and the locations where the items should be stocked allow the employee to move the items directly to the correct merchandising units.

In the discussion above, carousel-type merchandise support units have been shown and described. However, embodiments are not limited to carousels and other types of merchandise support units such as shelves, gondolas, and peg boards, for example, may be used.

An example of a computing device that can be used in the various embodiments described above is shown in the block diagram of FIG. 16. The computing device 10 of FIG. 16 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, non-volatile solid-state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid-state memory and external memory devices and their associated computer-readable media provide nonvolatile storage media for the computing device 10 on which computer-executable instructions and computer-readable data structures may be stored. Such computer-executable instructions can include instructions for performing any of the steps described in the methods above. Other types of media that are readable by a computer may also be used in the exemplary operation environment.

A number of program modules may be stored in the drives, solid state memory and RAM 20, including an operating system 38, one or more application programs 40, other program modules 42 and program data 44. In particular, program data 44 may include data stored in any of the databases or tables discussed above including the merchandise database 222 and the display information database 230.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 16. The network connections depicted in FIG. 16 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

Figure 16:
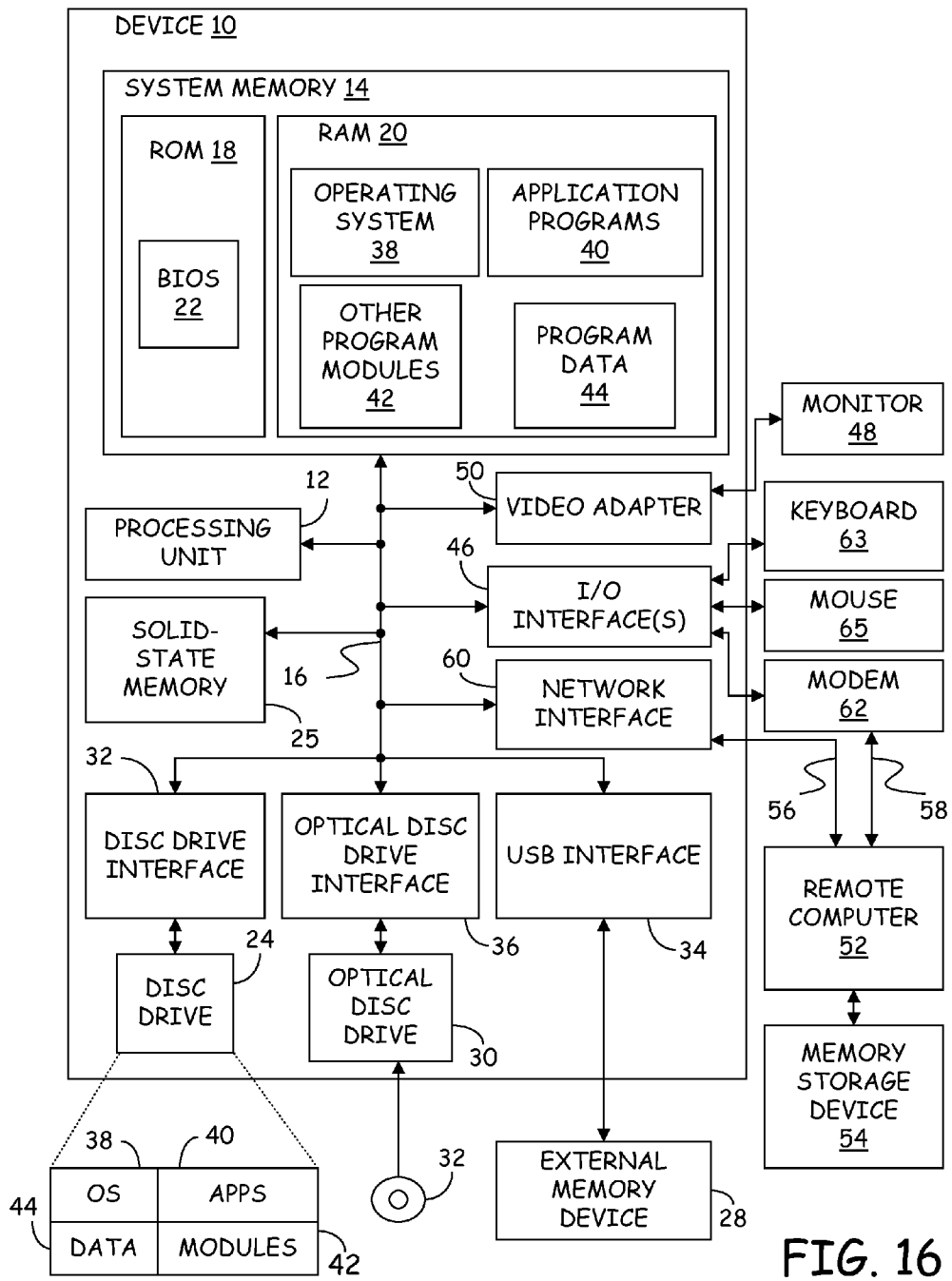
FIG. 16 is a block diagram of a computing device that may be used in accordance with the various embodiments.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 16 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. An electronic sign comprising:
   a sensor sensing merchandise near the electronic sign and providing at least one merchandise identifier;
   a processor that is programmed to execute instructions that cause the processor to perform steps comprising:
      determining that more than a first threshold quantity of one type of merchandise near the electronic sign is mis-shelved based on the at least one merchandise identifier;
      altering display information to include a stocking alert that the first threshold quantity of the one type of merchandise near the electronic sign is mis-shelved;
      determining that more than a second threshold quantity, higher than the first threshold quantity, of the one type of merchandise near the electronic sign is mis-shelved; and
      altering display information to include a price for the one type of mis-shelved merchandise when the second threshold quantity is exceeded; and
   a display, communicating with the processor, including a display section under control of the processor, wherein the display section includes a correctly shelved merchandise section that displays a price for correctly shelved merchandise and a mis-shelved merchandise section that displays the altered display information when the first threshold quantity of the one type of merchandise near the electronic sign is mis-shelved or the altered display information when more than the second threshold quantity of the one type of merchandise near the electronic sign is mis-shelved, and wherein the price for correctly shelved merchandise is displayed concurrently with the altered display information for the first or second threshold quantities.

2. The electronic sign of claim 1 wherein altering the display information to include the stocking alert comprises altering the display information to include a colored alert wherein the color of the colored alert indicates a quantity of mis-shelved merchandise that is not described in the altered display information.

3. The electronic sign of claim 1 wherein the processor performs further steps of receiving a request from a handheld device for merchandise identifiers of mis-shelved merchandise that is not described in the altered display information and in response transmitting merchandise identifiers of the mis-shelved merchandise that is not described in the altered display information to the handheld device.

4. The electronic sign of claim 1 wherein the price of the one type of mis-shelved merchandise is obtained by passing the at least one merchandise identifier to a server and receiving a price in return from the server.

5. The electronic sign of claim 1 wherein the sensor comprises an RFID sensor that senses radio frequency signals emitted from the merchandise.

6. A merchandising unit comprising:
   a merchandise support unit supporting items for sale; and
   an electronic sign configured for:
      displaying a price for correctly stocked items on the merchandise support unit,
      detecting incorrectly stocked items on the merchandise support unit,
      retrieving a price for the incorrectly stocked items,
      determining when a quantity of a type of incorrectly stocked items exceeds a first threshold,
      altering display information when the quantity of the type of incorrectly stocked items exceeds the first threshold so that the price for the correctly stocked items and the price for the incorrectly stocked items are concurrently displayed,
      detecting a quantity of additional incorrectly stocked items,
      determining that the quantity of additional incorrectly stocked items does not exceed the first threshold and therefore not displaying the price of the additional incorrectly stocked items, and
      determining that the quantity of additional incorrectly stocked items exceeds a second threshold, lower than the first threshold, and in response displaying an alert indicating that incorrectly stocked items are present on the merchandise support unit.

7. The merchandising unit of claim 6 wherein the electronic sign further receives a request from a handheld device for identifiers for incorrectly stocked items and in response provides identifiers for the additional incorrectly stocked items to the handheld device.

8. A method comprising:
   transmitting a request for an identification of incorrectly stocked items from a handheld device to a digital sign, the digital sign positioned on a merchandise support unit and displaying information about items on the merchandise support unit;
   receiving an identifier of at least one incorrectly stocked item at the handheld device from the digital sign, the at least one incorrectly stocked item comprising at least one item that has been stocked on the merchandise support unit but is not assigned to the merchandise support unit and that has been detected by a sensor in the digital sign;
   displaying a first indicator on the digital sign indicating that a quantity of the at least one incorrectly stocked item has been incorrectly stocked;
   displaying a second indicator on the digital sign indicating that a predetermined number of the at least one incorrectly stocked items higher than the quantity of the at least one incorrectly stocked item have been incorrectly stocked, wherein the second indicator is different from the first indicator and includes a price of the at least one incorrectly stocked item;
   displaying on the digital sign information relating to correctly stocked items on the merchandise support unit concurrently with the first and second indicators; and
   displaying on a display of the handheld device a description of at least one incorrectly stocked item based on the received identifier of at least one incorrectly stocked item.

9. The method of claim 8 further comprising displaying on the display of the handheld device an image of the at least one incorrectly stocked item.

10. The method of claim 9 further comprising transmitting a request for the image of the at least one incorrectly stocked item from the handheld device to a server and receiving the image of the at least one incorrectly stocked item at the handheld device from the server.

11. The method of claim 10 further comprising receiving a location where the at least one incorrectly stocked item is to be stocked at the handheld device from the server.

12. The method of claim 8 further comprising receiving a description of items that are correctly stocked on the merchandise support unit at the handheld device from the digital sign.

13. The method of claim 8 further comprising before transmitting the request for an identification of incorrectly stocked items to the digital sign:
- displaying a merchandise support unit selection user interface on the handheld device;
- receiving a selection of the merchandise support unit through the user interface; and
- identifying a communication address for communicating with the digital sign based upon the selection of the merchandise support unit.

14. The method of claim 13 wherein identifying a communication address comprises requesting the communication address from a server by transmitting an identifier for the merchandise support unit to the server and receiving the communication address from the server.

* * * * *